United States Patent [19]
Yoshii et al.

[11] Patent Number: 6,113,253
[45] Date of Patent: Sep. 5, 2000

[54] SUN VISOR ASSEMBLY AND METHOD OF ASSEMBLING THE SAME

[75] Inventors: Takanori Yoshii; Yasuo Kawata, both of Okazaki, Japan

[73] Assignee: Mitsubishi Jidosha Kogyo Kabushiki Kaisha, Japan

[21] Appl. No.: 09/151,834

[22] Filed: Sep. 11, 1998

[30] Foreign Application Priority Data

Sep. 11, 1997 [JP] Japan .................................. 9-246847

[51] Int. Cl.[7] .................................................. F21S 13/02
[52] U.S. Cl. ...................... 362/492; 296/214; 296/97.13
[58] Field of Search .................................. 362/139, 141, 362/142, 143, 144, 492; 296/97.1, 97.12, 97.13

[56] References Cited

U.S. PATENT DOCUMENTS

| | | | |
|---|---|---|---|
| 4,569,552 | 2/1986 | Marks | 296/97.13 |
| 4,989,911 | 2/1991 | Van Order | 296/97.9 |
| 5,082,322 | 1/1992 | Cenkander | 296/97.9 |
| 5,082,323 | 1/1992 | Dowd | 296/214 |
| 5,358,299 | 10/1994 | Seto | 296/97.9 |
| 5,430,624 | 7/1995 | Yoshida | 362/492 |
| 5,918,927 | 7/1999 | Renahy | 296/97.9 |

*Primary Examiner*—Sandra O'Shea
*Assistant Examiner*—H. S. Sawhney
*Attorney, Agent, or Firm*—Rossi & Associates

[57] ABSTRACT

A sun visor assembly is provided wherein a sun visor is easily attached to a headliner with an improved assembling efficiency. The sun visor assembly which is attached to a body panel includes a headliner that is mounted on the inner surface of the body panel, a sun visor which is attached to the headliner, and mounting members used for mounting the headliner on the body panel to form a sub-assembly prior to attaching the sub-assembly to a vehicle body panel.

20 Claims, 4 Drawing Sheets

SUN VISOR ASSEMBLY AND METHOD OF ASSEMBLING THE SAME

FIELD OF THE INVENTION

The present invention relates to a sun visor assembly and to a method of assembling a sun visor assembly.

BACKGROUND OF THE INVENTION

The main purpose of use of sun visors is to block sunlight entering the interior of a motor vehicle or vehicle compartment. In recent years, sun visors have been developed in which a vanity mirror with lighting equipment, or the like, is provided on one surface of the sun visor that faces a passenger when the sun visor is placed in a lowered use position to block sunlight. The known sun visor is installed on the vehicle after a headliner 102 is mounted on a vehicle body 103 on a production line, as shown in FIG. 6. Namely, after the headliner 102 is mounted on the vehicle body 103, a sun visor 100 and a sun visor holder 101 are respectively attached to the vehicle body 103 with the headliner 102 interposed therebetween. In FIG. 6, reference numeral 104 denotes screw holes formed in the vehicle body 103, for mounting the sun visor 100 and the sun visor holder 101, and reference numeral 105 denotes apertures formed in the headliner 102, through which a mounting base portion of the sun visor 100 and the sun visor holder 101 are inserted, to be attached to the vehicle body 103.

Since the sun visor is installed on the vehicle after the headliner is mounted on the vehicle body as described above, a workman is required to face upward in the interior of the vehicle during the installation, which makes it difficult to perform the installing operation, and requires a large number of assembling steps. Also, the above-described installing operation is conducted on the production line, and therefore a large number of assembling steps need to be done on the production line, resulting in an increased manufacturing cost and a reduction in the operating efficiency of the production line.

SUMMARY OF THE INVENTION

It is therefore an object of the present invention to provide a sun visor assembly and a method of assembling the sun visor assembly, wherein the sun visor can be easily attached to the headliner, assuring improved work efficiency with which the sun visor assembly is installed on the vehicle. It is also an object of the invention to provide a sun visor assembly with lighting equipment, wherein disconnection of wires of the lighting equipment can be avoided.

According to the present invention, a mounting member is used for attaching the sun visor to the headliner and attaching a unit of the headliner and sun visor to the body panel. By use of the mounting member, the operation for installing the sun visor on the vehicle is simplified, and can be easily performed.

According to the present invention, the headliner is tentatively attached to the body panel by means of the first fastener, and then fixed to the body panel by means of the second fastener. Thus, the operation for attaching the headliner to the body panel is simplified.

According to the present invention, the connector of electric wires for an illuminating device is fixed in the mounting member, and therefore movements of the wires are suitably limited.

According to the present invention, after the sun visor is fixed to the headliner by means of the mounting member, the mounting member is tentatively attached to the body panel with the first fastener, so as to adjust the position of the headliner and sun visor relative to the body panel, and then fixed to the body panel with the second fastener, so that the sun visor is fixed to the body panel.

BRIEF DESCRIPTION OF THE DRAWINGS

The invention will be described in detail with reference to certain preferred embodiments thereof and the accompanying drawings, wherein.

DETAILED DESCRIPTION OF THE PREFERRED EMBODIMENTS

Figure 1:
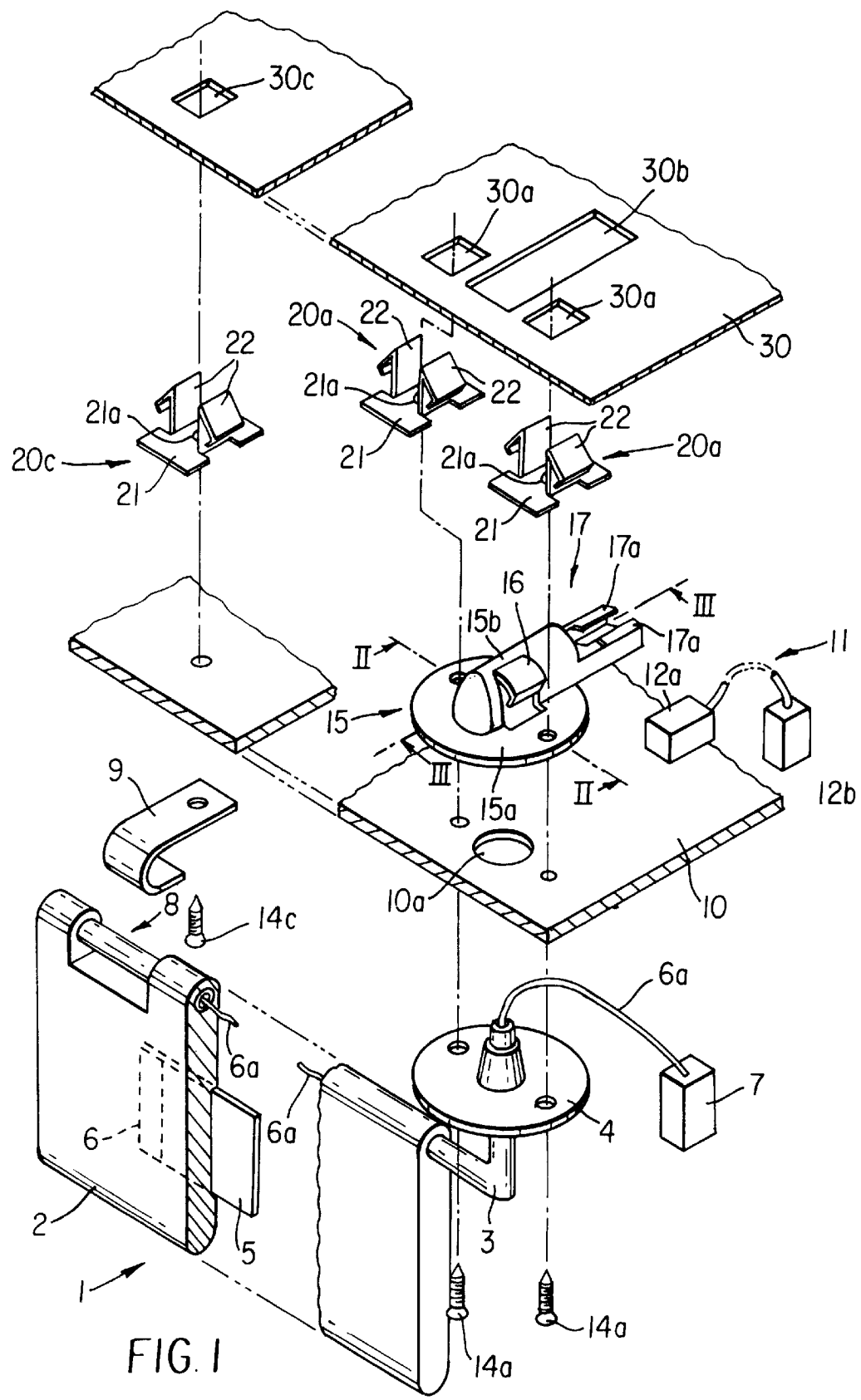
FIG. 1 is an exploded, perspective view showing one embodiment of the present invention.

A preferred embodiment of the present invention will be described in detail with reference to the accompanying drawings. In FIG. 1, a sun visor 1 includes a visor body 2 in the form of a plate, for blocking sunlight entering the interior of the vehicle, an arm 3 formed by a hollow shaft, for supporting the visor body 2 along one edge thereof, and a base portion 4 for supporting a free end of the arm 3 such that the arm 3 is freely rotatable.

A part of the visor body 2 in the neighborhood of its one end remote from the base portion 4 is removed to form a notch, such that a corresponding part of the arm 3 is exposed to the outside. The exposed arm 3 provides an engaging portion 8 which engages with a sun visor holder 9 which will be described later. A vanity mirror 5 and a lamp member 6 for illuminating the vanity mirror 5 are provided on one surface of the visor body 2 which faces a vehicle passenger when the sun visor is placed in a lowered use position for blocking sunlight. A wire harness 6a, which is connected to the lamp member 6, passes through the inside of the arm 3, and is led out from an end portion of the base portion 4, and a connector 7 is provided at an end portion of the harness 6a. The connector 7 is fixedly secured to a connector hook portion 17 which will be described later.

Figure 2:
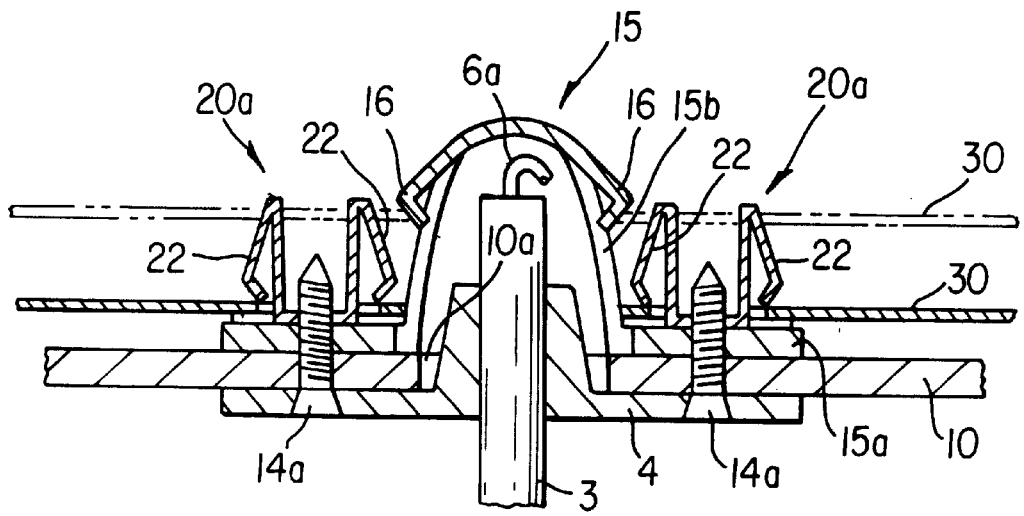
FIG. 2 is a cross-sectional view taken along line II—II of FIG. 1, showing a part of the embodiment of FIG. 1 in the vicinity of a base portion of a sun visor.
Figure 3:
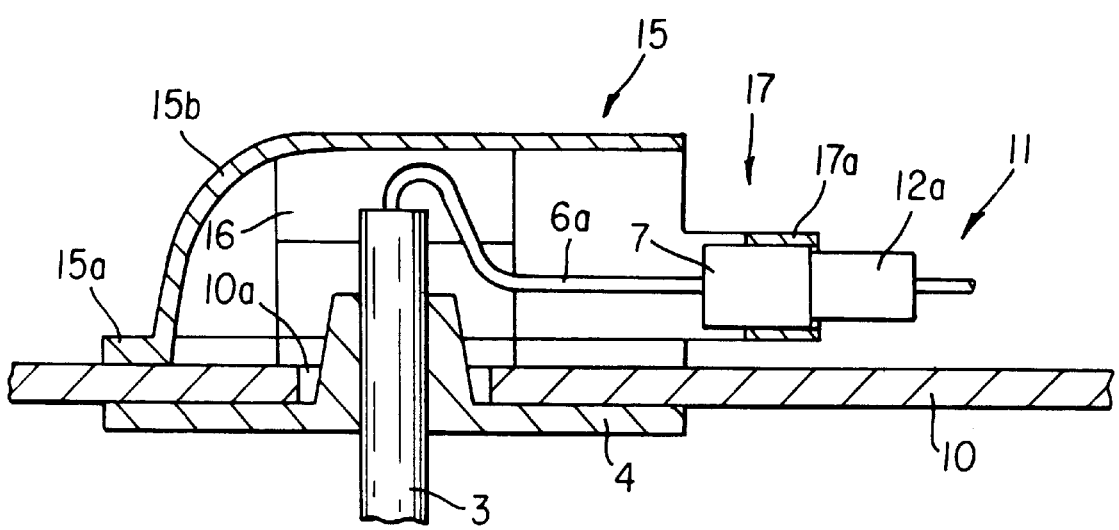
FIG. 3 is a cross-sectional view taken along line III—III of FIG. 1, showing a part of the embodiment of FIG. 1 in the vicinity of the base portion.

As shown in FIG. 1 through FIG. 3, the base portion 4 of the sun visor 1 cooperates with a pair of clips 20a, 20a disposed above the headliner 10 to sandwich the headliner 10 at its upper and lower surfaces between them, and the base portion 4 and the clips 20a, 20a are fastened to each other by means of screws 14a so that the headliner 10 is installed in position. The base portion 4 is prevented from rotating due to the use of the pair of clips 20a, 20a, thereby avoiding shifts in the position of installation of the sun visor 1 which would otherwise occur due to rotation of the base portion 4, thus assuring improved accuracy of the installation position of the sun visor 1.

A retainer 15 having substantially the same size as the base portion 4 is provided between the clips 20a, 20a and the headliner 10. When the base portion 4 and the clips 20a, 20a are fastened to each other, the retainer 15 is sandwiched between the clips 20a, 20a and the headliner 10, to be mounted on the headliner 10 along with the clips 20a, 20a.

The retainer 15 includes a pair of tacking snap portions 16 for tacking the headliner 10 to which both the clips 20a, 20a and the base portion 4 are attached, on to a body panel 30, namely, tentatively attaching the headliner 10 to the body panel 30. The retainer 15 further includes a connector hook portion 17 for holding the connector 7 to fix it to the retainer 15. The tacking snap portions 16, 16 are formed on opposite side walls of a cover portion 15b which protrudes upward from a base portion 15a so as to cover the distal end of the arm 3. On one side of the cover portion 15b, the connector hook portion 17 is formed as an integral part of the cover portion 15b. The connector hook portion 17 includes a pair of hooks 17a, 17a which grip and hold the connector 7.

Each of the clips 20a, 20a is formed from a metal plate, and consists of a base portion 21 provided with a threaded portion 21a into which a screw part of the screw 14a is screwed, and a pair of hook portions 22, 22 which engage with respective apertures 30a formed through the body panel 30 to which the headliner 10 is attached. The hook portions 22 are formed by bending parts of the base portion 21.

An escape aperture 30b which receives the cover portion 15b and connector hook portion 17 of the retainer 15 is formed between the apertures 30a of the body panel 30. Part of the periphery of the escape aperture 30b is used as engaging portions which engage with the tacking snap portions 16, 16. In addition to the apertures 30a and escape aperture 30b, the body panel 30 is further formed with an aperture 30c which receives hooks 22 of a clip 20c for installing the sun visor holder 9.

The tacking snap portions 16, 16 and hook portions 22, 22 will be now explained in detail. As shown in FIG. 2, the tacking snap portions 16, 16 of the retainer 15 are located at a higher position than the hook portions 22, 22 of the clips 20a, 20a. Namely, the tacking snap portions 16, 16 are located at a position closer to the body panel 30 than the hook portions 22, 22. With this arrangement, when the headliner 10 is attached to the body panel 30, the tacking snap portions 16, 16 are brought into engagement with the body panel 30 before the hook portions 22 engage with the panel 30. When the tacking snap portions 16, 16 are received in the escape aperture 30b of the body panel 30, clearances or gaps for allowing adjustment of the position of the headliner 10 are present between the snap portions 16, 16 and the periphery of the escape aperture 30b. The hook portions 22, 22, on the other hand, are held by the body panel 30 when they are fitted in the apertures 30a, 30a of the body panel 30, so that the headliner 10 is fixed to the body panel 30.

Thus, the engagement of the hook portions 22, 22 with the body panel 30 is stronger than the engagement of the tacking snap portions 16, 16 with the body panel 30. In other words, the tacking snap portions 16, 16 can be more easily brought into engagement with the body panel 30 than engaging the hook portions 22 with the body panel 30, thus permitting easy tacking of the headliner 10 on to the body panel 30.

On the surface of the headliner 10 opposite to the surface to which the sun visor 1 is attached, there is provided a relay harness 11 which connects the connector 7 to a harness for a power supply that is extended from the vehicle body. Connectors 12a, 12b are provided at the opposite ends of the relay harness 11. A harness for a room lamp, or the like, may be also connected to the relay harness 11. A portion of the headliner 10 which is sandwiched between the base portion 4 and the retainer 15 is provided with an aperture 10a whose size is large enough to allow the connector 7 to pass through.

In the meantime, when the sun visor 1 is attached to the headliner 10, the sun visor holder 9 that engages with the engaging portion 8 to hold the end portion of the sun visor 1 is attached to a portion of the headliner 10 that corresponds to the engaging portion 8. The sun visor holder 9 is formed in a generally J-like shape in cross section, and attached to the headliner 10 in the same manner as the base portion 4. Namely, the headliner 10 is sandwiched at its upper and lower surfaces between the sun visor holder 9 and the clip 20c, and the sun visor holder 9 and the clip 20c are fastened to each other by means of a screw 14c so that the holder 9 is attached to the headliner 10.

Figure 4:
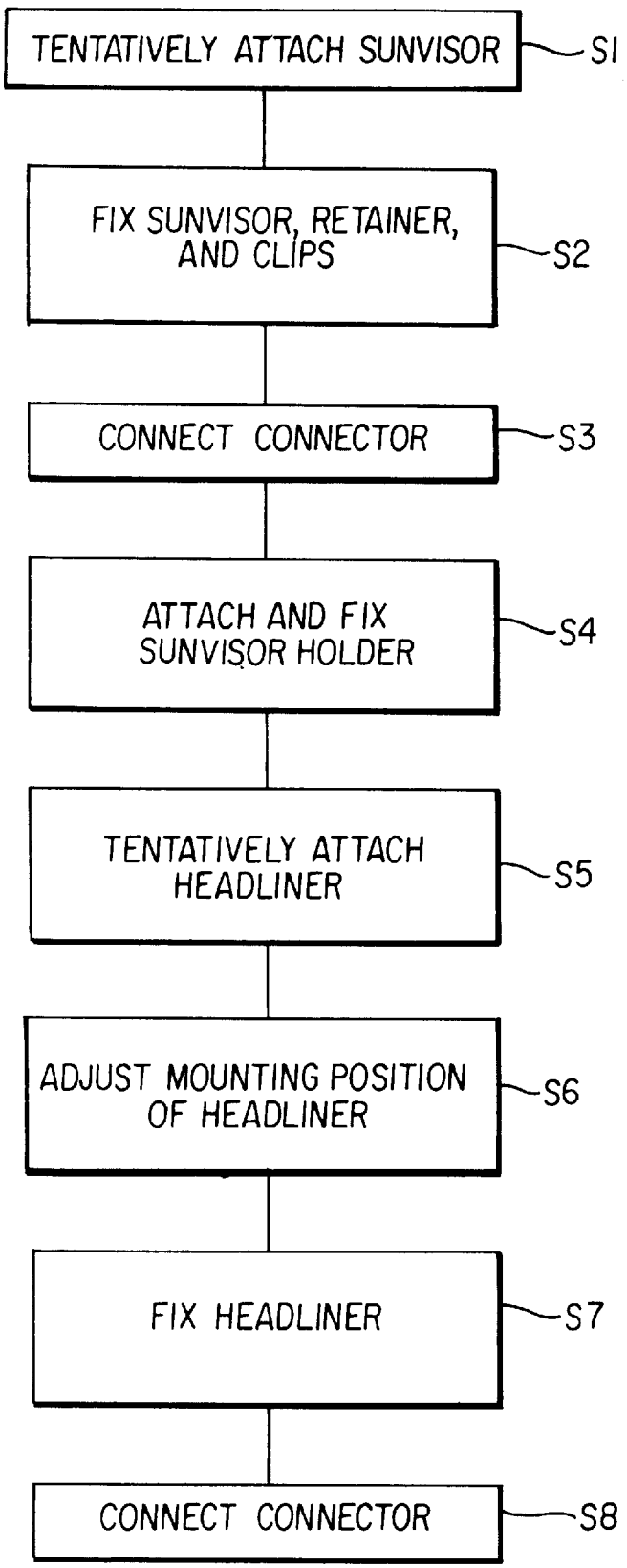
FIG. 4 is a flowchart showing the process of installing the sun visor on the vehicle.

A process of installing the sun visor 1 on the vehicle will be now described in detail with reference to FIG. 1 and FIG. 4 showing the flow of the mounting process.

Initially, in step 1, the headliner 10 is sandwiched at its upper and lower surfaces between the base portion 4 of the sun visor 1 and the retainer 15 which have been assembled in separate steps. Namely, the retainer 15 is mounted on one side of the headliner 10 which faces the body panel 30, and the base portion 4 is mounted on the other side of the headliner 10 which faces the interior of the vehicle, so that the headliner 10 is sandwiched between the retainer 15 and the base portion 4. In this step, the connector 7 is inserted through the aperture 10a from the lower side of the headliner 10, to be held by the connector hook portion 17 of the retainer 15, as shown in FIG. 3. When the headliner 10 is sandwiched between the base portion 4 and the retainer 15, mounting holes of the base portion 4, retainer 15 and the headliner 10 for receiving the screws 14a, 14a are aligned with each other.

Subsequently, the threaded portions 21a of the clips 20a are aligned with the mounting holes of the retainer 15, and the clips 20a are attached to the retainer 15. After the base portion 4, retainer 15 and the clips 20a are tentatively attached to the headliner 10, the process proceeds to step S2.

With the connector 7 held by the connector hook portion 17 of the retainer 15, the range of movement of the harness 6a is limited, and therefore the harness 6a is prevented from being trapped between the base portion 4 and the headliner 10, or being exposed to the outside.

In step S2, the screws 14a, 14a are screwed into the threaded portions 21a of the clips 20a, so that the base portion 4, retainer 15 and the clips 20a are respectively fixed to the headliner 10, whereby the base portion 4, retainer 15, clips 20a and headliner 10 provide an integral assembly.

In this manner, the base portion 4, retainer 15 and clips 20a are attached to the headliner 10 by a single attaching operation, namely, by screwing the screws 14a into the threaded portions 21a of the clips 20a. Thus, the attaching operation is carried out in a simplified manner with improved work efficiency, and the number of process steps can be reduced.

In step S3, the connector 7 and the connector 12a are connected to each other, and the flow goes to step S4. In step S4, the sun visor holder 9 is attached to the headliner 10. More specifically, corresponding mounting holes of the sun visor holder 9, clip 20c and the headliner 10 are aligned with each other, and the headliner 10 is sandwiched at its upper and lower surfaces between the sun visor holder 9 and the clip 20c. In this state, the screw 14c is screwed into the threaded portion 21a of the clip 20c, so that the sun visor holder 9 is fixed to the headliner 10. With the sun visor 1 and the sun visor holder 9 both fixedly secured to the headliner 10, a sub assembly unit of the headliner 10 and the sun visor 1 is produced.

In step S5, the assembly or unit of the headliner 10 and the sun visor 1 is carried inside of the vehicle body which is being transported on a production line, and temporarily attached to the body panel 30 that provides a roof of the vehicle body. More specifically described referring to FIG. 2, the tacking snap portions 16 of the retainer 15 are brought into engagement with the aperture 30b of the body panel 30. The position of the body panel 30 at this time is indicated by two-dot chain lines in FIG. 2. In this state, the headliner 10 and the sun visor 1 forms a sub-assembly unit that is tentatively attached to the body panel 30 by means of the tacking snap portions 16 and a clip(s) (not illustrated) for mounting the headliner 10 on the body panel.

While the headliner 10 is being tentatively attached to the body panel 30 as described above, the position of installation of the headliner 10 may be shifted within a certain range. In step S6, therefore, the installation position of the headliner 10 is adjusted to a precise position as viewed in the front-to-rear direction and lateral direction of the vehicle body, on the basis of the position of the sun visor holder 9.

After the adjustment of the installation position of the headliner 10 is completed, step S7 is executed to engage the hook portions 22 of the respective clips 20a with the corresponding apertures 30a of the body panel 30. Similarly to the clips 20a, the clip 20c for installing the sun visor holder 9 is also brought into engagement with the body panel 30. With the hook portions 22 of the clips 20a, 20c being in engagement with the body panel 30, the unit of the headliner 10 and the sun visor 1 is fixed to the body panel 10.

In step S8, the connector 12b is connected to a connector of a harness provided on the vehicle body, at around a pillar of the vehicle body.

In the process as described above, the sun visor 1 and other components are fixed to the headliner 10 outside the production line, to provide a subassembly unit of the headliner 10 and the sun visor 1, which leads to a reduced number of process steps on the production line and reduced manufacturing cost. The unit of the headliner 10 and the sun visor 1 is then mounted on the body panel 30 in two process steps, namely, a tacking step using the tacking snap portions 16 and a fixing step using the hook portions 22. Accordingly, the operation in each process step is simplified, and the efficiency with which the operation is carried out is improved.

The operation for attaching the unit of the headliner 10 and the sun visor 1 to the body panel 30 is performed while a workman is facing upward in the interior of the vehicle. Since this attaching operation is divided into two process steps, the work time in which the workman works in each step while facing upward inside the vehicle is reduced, and therefore the burden on the workman can be reduced. Conventionally, the workman performs the whole operation for installing the sun visor 1 on the vehicle while facing upward inside the vehicle from the beginning to the end of the operation. In the operation of the present embodiment, on the other hand, the installing operation is divided into two steps, and therefore the operation that requires the workman to face up is interrupted for a short time between the two steps, thus reducing the burden on the workman.

Furthermore, the tacking operation using the tacking snap portions 16 and the fixing operation using the hook portions 22 are accomplished only by bringing the tacking snap portions 16 and the hook portions 22 into engagement with the apertures 30a, 30b, 30c of the body panel 30, respectively. These operations are easy to perform, and the work time can be also reduced in this respect, thereby assuring an improved work efficiency, reduced manufacturing cost on the production line, and high operating efficiency of the production line.

Figure 5:
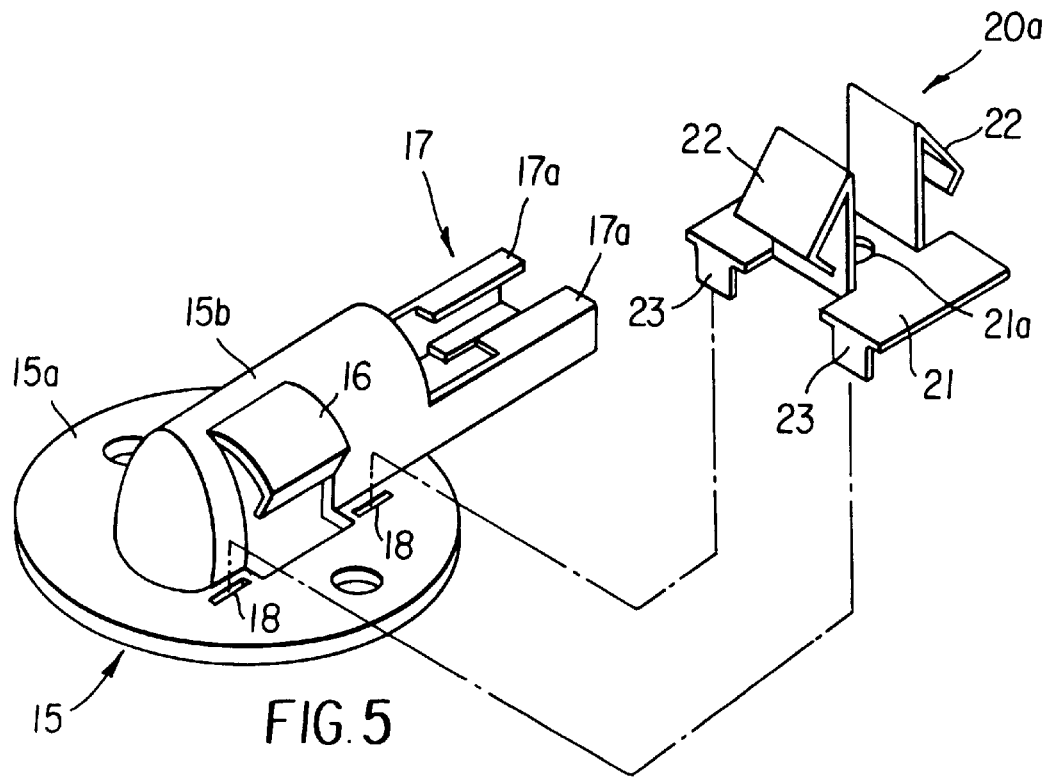
FIG. 5 is an exploded, perspective view showing a modified example of retainer and clip.
Figure 6:
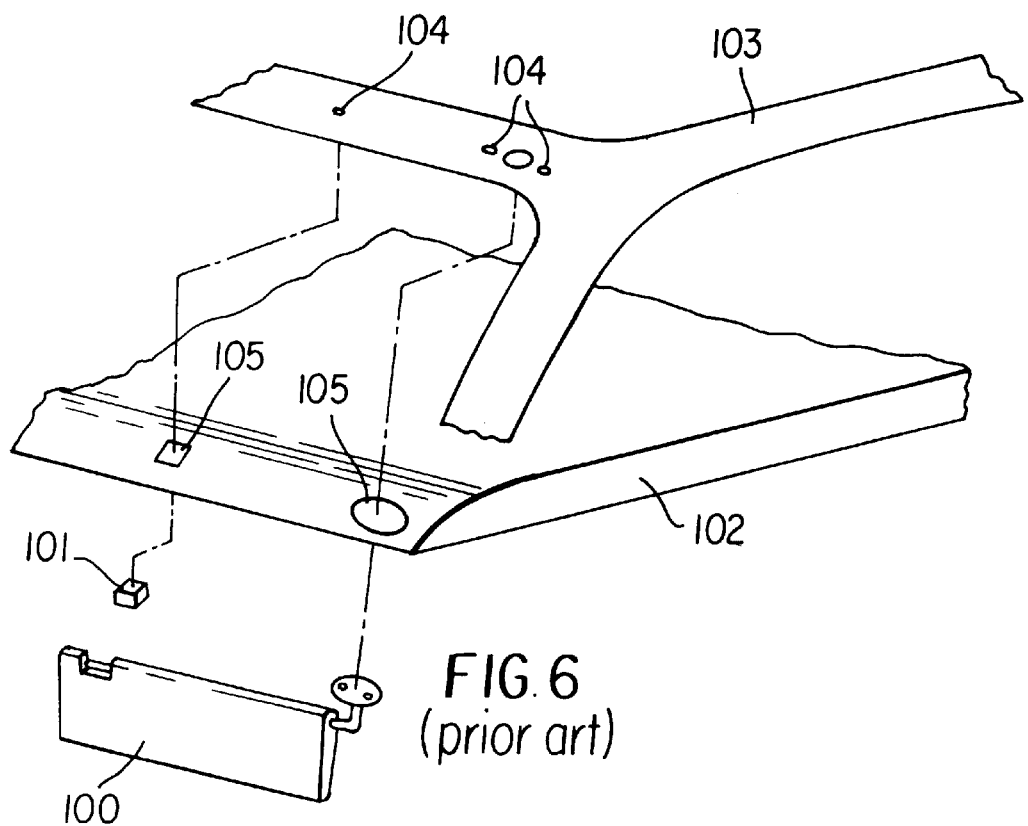
FIG. 6 is a perspective view useful in explaining a known manner in which a sun visor is installed on a motor vehicle, which view shows a principal part of a vehicle body to which the sun visor is attached.

Referring next to FIG. 5, a modified example of the above-described embodiment will be now described. In FIG. 5, the same reference numerals as used in FIGS. 1–3 are used for identifying corresponding components, of which detailed description will not be provided, and only differences from the embodiment of FIGS. 1–3 will be explained. This modified example is provided with positioning means for determining the positions of the retainer and clips as used in the above-described embodiment.

The retainer and clips of the modified example will be described in detail. In FIG. 5, a pair of tongues 23, 23 are formed at one side edge of the base portion 21 of the clip 20a, such that the tongues 23, 23 protrude downward from the clip 20a, namely, in the direction opposite to that in which the hook portions 22 protrude. On the other hand, apertures 18, 18 which respectively receive the tongues 23, 23 are formed in portions of the base portion 15a of the retainer 15 which correspond to the tongues 23, 23, namely, in the vicinity of a portion of the retainer base portion 15a where the base of the cover portion 15b is raised upward. Another pair of apertures 18, 18 are also formed on the opposite side of the cover portion 15b remote from the above pair of apertures 18, 18.

The pair of tongues 23, 23 and apertures 18, 18 constitute the positioning means for determining the positions of the retainer 15 and the clip 20a. With this arrangement, the clip 20a is easily attached to the retainer 15, by inserting the tongues 23, 23 into the apertures 18, 18 for engagement with the retainer 15, thus assuring improved accuracy of the relative positions of the clip 20a and the retainer 15. Also, apertures similar to the apertures 18, 18 may be formed in the headliner 10 and the base portion 4, so as to facilitate installation of the headliner 10 and the base portion 4, to thus improve the accuracy of their relative installation positions.

While the engaging portions of the clips 20a, 20c take the form of hook portions 22, 22 in the illustrated embodiment, the shape of the engaging portions are not limited to that of the embodiment, but may be selected from any shape provided that the clips 20a, 20c can engage with the body panel 30. Also, the hook portions 22, 22 may be formed integrally with the retainer 15. Furthermore, the shape of the connector holding portion of the retainer 15 is not limited to that of the illustrated embodiment, provided that the holding portion functions to hold the connector 7 and fix it to the retainer 15.

What is claimed is:

1. A sun visor assembly, comprising:
    a sun visor;
    a body panel liner;
    a mounting means, including a retainer, for attaching said sun visor to said body liner to form a sub-assembly unit;
    a first fastener that tentatively attaches said mounting means to a body panel, said first fastener allowing displacement of the sub-assembly unit relative to the body panel; and
    a second fastener that fixes said mounting means to the body panel, said second fastener determining a relative position of the sub-assembly unit with respect to the body panel.

2. The sun visor assembly as defined in claim 1, wherein said first fastener is provided on said mounting means.

3. The sun visor assembly as defined in claim 2, wherein said second fastener is provided on said mounting means.

4. The sun visor assembly as defined in claim 1, wherein said sun visor comprises:
   a sun visor body which blocks sunlight entering from an outside;
   an arm which extends from a first of said sun visor body; and
   a base portion which supports a free end of said arm such that the arm is freely rotatable; and
   wherein retainer is provided on a surface of said liner which faces the body panel, said base portion and said retainer being coupled to each other such that said liner is interposed between the base portion and the retainer.

5. The sun visor assembly as defined in claim 4, further comprising:
   a sun visor holder which holds a portion of said sun visor in the vicinity of a second end of said sun visor body; and
   a third fastener which fixes said sun visor holder to the body panel;
   wherein said sun visor holder and said third fastener are coupled to each other such that said liner is interposed between the sun visor holder and the third fastener.

6. The sun visor assembly as defined in claim 4, further comprising:
   a lamp provided on said sun visor body;
   an electric wire which supplies electric power to said lamp; and
   a connector provided at an end portion of said wire,
   wherein said retainer comprises a hook portion which holds said connector.

7. The sun visor assembly as defined in claim 4, wherein said second fastener comprises at least one second clip, said base portion of said sun visor and said second clip being coupled to each other such that said liner and said retainer are interposed between the base portion and the second clip.

8. The sun visor assembly as defined in claim 7, wherein said second clip includes an engaging portion which engages with said retainer, said engaging portion defining a relative position between the second clip and the retainer.

9. The sun visor assembly as defined in claim 7, wherein said second fastener comprises at least two second clips.

10. The sun visor assembly as defined in claim 1, wherein said first fastener comprises a first clip, and said body panel includes a first opening which receives said first clip for engagement of the first clip with the body panel.

11. The sun visor assembly as defined in claim 1, wherein said second fastener comprises a second clip, and said body panel includes a second opening which receives said second clip for engagement of the second clip with the body panel.

12. The sun visor assembly as defined in claim 11, wherein the second fastener comprises at least two second clips.

13. A method of assembling a sun visor assembly, comprising:
   coupling a sun visor to a body panel liner using a mounting means to form a sub-assembly;
   tentatively attaching the mounting means to the body panel, so that the sub-assembly can be displaced relative to the body panel;
   adjusting a relative position of the sub-assembly with respect to the body panel; and
   fixing the mounting member to the body panel.

14. The method as defined in claim 13, wherein said mounting means comprises a retainer provided on a surface of said liner that faces the body panel, and said coupling step comprises a step of sandwiching said liner between said sun visor and said retainer.

15. The method as defined in claim 13, wherein said step of tentatively attaching comprises a step of engaging a first fastener provided on said mounting means with a first opening formed in said body panel.

16. The method as defined in claim 15, wherein said fixing step comprises a step of engaging a second fastener provided on said mounting means with a second opening formed in said body panel.

17. The method as defined in claim 13, wherein the sun visor assembly includes a sun visor holder which holds an end portion of said sun visor remote from said mounting means, said method further comprising a step of fixing said sun visor holder to said body panel.

18. The method as defined in claim 17, wherein said sun visor assembly comprises a third fastener which fixes said sun visor to said body panel, said method further comprising a step of sandwiching said liner between the sun visor and the third fastener.

19. The method as defined in claim 13, wherein said sun visor assembly includes:
   a lamp provided on a sun visor body of said sun visor;
   a first electric wire connected to said lamp; and
   a second electric wire connected to a power supply;
   wherein said method further comprises a step of connecting said first wire with said second wire.

20. The method as defined in claim 19, wherein said sun visor assembly includes a connector for connecting said first wire with said second wire, and wherein said method further comprises a step of fixing said connector to said mounting means.

* * * * *